United States Patent Office 2,943,020
Patented June 28, 1960

2,943,020
COMPOSITION FOR THE SYMPTOMATIC TREATMENT OF THE MALE CLIMACTERIC

William L. Gould, 453 Western Ave., Albany, N.Y.

No Drawing. Filed Dec. 9, 1957, Ser. No. 701,302

7 Claims. (Cl. 167—55)

The present invention relates to pharmaceutical preparations which are effective for the treatment of the symptoms of the male climacteric and senility, and more particularly to preparations which have the effect of relieving males of the climacteric.

This application is a continuation-in-part of my copending application Serial No. 541,851, filed October 20, 1955, for "Therapeutic Compositions," which in turn is a continuation-in-part of my application Serial No. 95,383, filed May 25, 1949, both now abandoned.

It is a primary object of the present invention to provide a composition for the treatment of the male climacteric and senility which composition has highly effective results with no undesirable side effects.

It is another object of the present invention to provide for a method of relieving males of the effects of the climacteric by the administration of the preparation of the present invention.

Other objects and advantages of the present invention will be apparent from a further reading of the specification and of the appended claims.

With the above objects in view, the preparation of the present invention mainly comprises as essential coactive ingredients: chorionic gonadotropin, thiamin chloride (vitamin $B_1$), and glutamic acid, together and in such proportions to one another that each inordinately enhances and synergistically increases the effectiveness of the others.

Heretofore, testosterone was prescribed for use in the male climacteric and senility. However, it was not always helpful and often manifests significant disadvantages and causes certain undesirable side effects. Thus, its use is rightly feared, particularly in cases of senility.

It was the common belief in practise that male hormones generally are administered to males and female hormones to women. Occasionally, there might be an interchange, for example, when an estrogen is given to treat a case of carcinoma of the prostate, and testosterone in malignancy of the breast or to control menorrhagia.

Contrary to former belief, even though they contain a female hormone (i.e. a female source), the preparations of the present invention unexpectedly help males more than does a hormone of the male origin. This is particularly so in the particular combination of the present invention due to the enhanced effectiveness of the chorionic gonadotropin by reason of the presence of thiamin chloride and the glutamic acid together.

As a matter of fact, the preparation of the present invention, comprising chorionic gonadotropin (preferably from human pregnancy urine) along with glutamic acid and thiamin chloride, in suitable ratios to one another are actually much more helpful than testosterone in treating the male climacteric and senility. They are much safer, give earlier relief, and exhibit much higher effectiveness.

The preparations of the present invention comprise the chorionic gonadotropin in the ratio of from 160 to about 320 international units to from about .1 mg. to about 10 mg. of glutamic acid, and with at least one vitamin B complex vitamin or factor such as thiamin chloride present to the extent of two and one-half times the amount of the glutamic acid.

The preparations of the present invention are prepared preferably for administration by injection, usually, but not necessarily, intramuscularly. For such administration, the three cooperating essential ingredients of the present invention are dispersed or dissolved in water or another injectable aqueous vehicle.

The chorionic gonadotropic hormone utilized in the composition of the present invention is preferably derived from urine of pregnant women, although that obtained from other pregnant mammals, especially mares, can also be used. This hormone can also be obtained from the placenta and may also originate from the anterior lobe of the pituitary gland. The gonadotropic hormone from pregnant urine has been found to be advantageously effective as one of the three essential ingredients of the composition of the present invention.

The glutamic acid can be replaced in part or in whole by an equivalent amount of a salt of glutamic acid that is non toxic at the particular dosage regimen, for example an alkali metal salt such as sodium or potassium glutamate. The use of sodium glutamate can be avoided for patients on a low sodium diet.

Similarly, the thiamin chloride has been replaced by other vitamin B complex vitamins or factors, such as riboflavin, however, thiamin chloride has been found to act much more synergistically in the combination of the present invention than in the case of any other vitamin B complex factor.

Tests have been made utilizing chorionic gonadotropin alone, thiamin chloride alone, glutamic acid alone, chorionic gonadotropin and thiamin chloride together, chorionic gonadotropin and glutamic acid together, and thiamin chloride and glutamic acid together. However it was found that in all of the cases the results obtained were only within the expected range of effectiveness. However, when a composition containing all three of these essential ingredients was tested it was found that the results obtained were truly synergistic and that the effectiveness of the composition was increased much greater than could be expected by simply the sum of the action of the individual components of the composition of the present invention.

A most important advantage of the composition of the present invention is that when given to the patient the patient's climacteric symptoms were quite quickly relieved, the patient obtaining a feeling of well being in a very short time, without the patient having any undesirable side effects. The preparations of the present invention are apparently effective in all definite male climacteric cases, except those with marked cardiac or cerebrovascular pathology. The preparations are not only more potent than testosterone, but actually seem to help males more than the estrogens do the females. This is rather a paradox, for the opposite heretofore seemed true in sex hormone therapy. However the answer might lie in the particular combination of ingredients utilized.

After administering the preparation of the present invention at the maintenance level for about three months, the regime is tapered off to one dose every two weeks, then one dose every three weeks, and one monthly, and so on as improvement indicates.

However, if necessary, the weekly dose may be maintained indefinitely, without any danger of undesirable side effects.

Patients with prostatic symptoms require the least maintenance of therapy, often going many months without treatment after a regime utilizing the composition of the present invention. Those patients with hypogonadism (such as Froehlich's syndrome) and impotence require the most persistent treatment. Those with nervous and miscellaneous symptoms take variable dosage regime, depending upon the degree of improvement.

Treatment with the preparation of the present invention is not necessarily limited to the climacteric period (which roughly may be anywhere from 40 to 60 years of age, but most actively prevails from between 45 and 55). Cases of older age are more related to senility and gonadal decline. Therefore, the diagnostic and therapeutic evaluation of my new preparations bear the same relationship in male senility as in the climacteric because both are due to gonadal decline as the result of increasing age. Similar results were noted in both age groups (climacteric and senility). My new drug is helpful in restoring gonadotropic efficiency in the aged and in improving their general condition.

The relief of the stress and strain that the new preparation of the present invention gives in the male climacteric, suggests its possibilities not only for curative but for preventative purposes. It was given in early cases to prevent the more serious complications. The preventative therapy definitely seems to lessen the active stage and the end results of the male climacteric.

This therapy with the preparations is effective only when the condition is definitely the result of the male climacteric. It is valuable too in male senility. In male senility where testosterone frequently is contraindicated, my new drug is found to be safe and helpful.

To avoid the possibility of any slight sting at the site of injection with some patients, the preparation in solution form (such as in the examples which will follow) can include from about 0.01 to about 0.05 gram of procaine hydrochloride per cubic centimeter. Usually about 0.01 gram is adequate and preferred. The equivalent amount of any other compatible local anesthetic can be used.

When the solution form of my preparations are to be stored for some time before being used, it is advisable to keep them under refrigeration. With suitable precautions and use of compatible diluents and binders, the preparations can be tableted. They also can be encapsulated in dry form, for example, gonadotropin powder can be admixed suitably with finely powdered starch to take on an adequately thin adhering coating, and thus then can be admixed with the thiamin chloride and the glutamic acid. Alternatively, such starch coated chorionic gonadotropin can be tableted with the thiamin chloride and glutamic acid under conditions avoiding wetting the hormone whereby it is only slightly wetted and for only a very short interval.

The preparations of the present invention provide rapid and effective value in the male climacteric and senility, as well as in the symptoms of the male climacteric.

The following examples are given to further illustrate the present invention. The scope of the invention is not, however, meant to be limited to the specific details of the examples.

Example 1

An isotonic aqueous solution containing per cubic centimeter: 200 international units of gonadotropin, 25 milligrams of thiamin chloride, and 52.5 parts per million of glutamic acid is prepared. This solution is an injectable (i.e. ready for use by injection) by being sterilized after preparation, or by having been prepared under sterile conditions from separate sterile aqueous solutions of each of the three individual essential ingredients respectively. The preparation can be injected in doses of 1 cubic centimeter each at a regimen, governed by the individual patient's improved response, of twice weekly for the first month or two or three, and thereafter at a maintenance level of once a week.

This preferred preparation can be prepared from the following stock aqueous solutions: (a) chorionic gonadotropin in a concentration of 500 international units per cubic centimeter, (b) thiamin chloride in a concentration of 100 milligrams per cubic centimeter, and (c) glutamic acid in a concentration of 150 parts per million. Thus, the foregoing preferred example is composed by volume of 40% of solution a, 25% of solution b, and 35% of solution c.

These percentage proportions can be varied appropriately when stock solutions of the essential ingredients are used in concentrations different from those of this example, to give a final composition the same as that of the example. Thus, there have been used stock solutions of (1) the chorionic gonadotropin in a range of from 400 to 800 international units per cubic centimeter, (2) the thiamin chloride from 100 to 500 milligrams per cubic centimeter, and (3) the glutamic acid from 100 to 1000 parts per million.

However, combinations of the stock solutions of the above respective range of concentrations and without changing the foregoing percentage volume taken of each were used to give effective variations of the final composition of preparations embraced by the invention and containing the three essential ingredients of the invention.

Example 2

An isotonic aqueous solution is prepared containing per cubic centimeter: 160 international units of chorionic gonadotropin, 75 milligrams of thiamin chloride, and 35 parts per million of glutamic acid. This preparation is prepared utilizing the following stock aqueous solutions: (a) chorionic gonadotropin in a concentration of 400 international units per cubic centimeter, (b) thiamin chloride in a concentration of 500 milligrams per cubic centimeter, and (c) glutamic acid in a concentration of 100 parts per million. The preparation is thus prepared utilizing 40% of a solution a, 25% of solution b, and 35% of solution c.

Example 3

An isotonic aqueous solution is prepared containing per cubic centimeter: 320 international units of chorionic gonadotropin, 25 milligrams of thiamin chloride, and 350 parts per million of glutamic acid. This solution is prepared from the following stock aqueous solutions: (a) chorionic gonadotropin in a concentration of 800 international units per cubic centimeter, (b) thiamin chloride in a concentration of 100 milligrams per cubic centimeter, and (c) glutamic acid in a concentration of 1000 parts per million. The preparation is prepared utilizing by volume 40% of solution a, 25% of solution b and 35% of solution c.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A composition adapted for the treatment of the male climacteric and senility, said composition comprising as essential co-active ingredients chorionic gonadotropin, glutamic acid and thiamin chloride in the ratio of about 160 to about 320 international units of chorionic gonadotropin to about .1 milligram to about 10 milligrams of glutamic acid and thiamin chloride in an amount of at least about two and one-half times the amount of glutamic acid.

2. A pharmaceutical preparation for the treatment of the male climacteric and senility, said preparation comprising an aqueous solution for injection containing as essential co-active ingredients chorionic gonadotropin, glutamic acid and thiamin chloride in the ratio of about 160 to about 320 international units of chorionic gonadotropin to about .1 milligram to about 10 milligrams of glutamic acid and thiamin chloride in an amount of at least about two and one-half times the amount of glutamic acid.

3. A preparation as claimed in claim 1 wherein the chorionic gonadotropin is derived from mammalian pregnancy urine.

4. A preparation as claimed in claim 3 wherein the chorionic gonadotropin is derived from human pregnancy urine.

5. A therapeutic preparation for the treatment of the male climacteric and senility, said preparation comprising an aqueous isotonic solution for injection containing per cubic centimeter: between 160 and 320 international units of chorionic gonadotropin, between 25 and 75 milligrams of thiamin chloride, and between 35 and 350 parts per million of glutamic acid.

6. A pharmaceutical preparation for the treatment of the male climacteric and senility, said preparation comprising an isotonic aqueous solution containing about 200 international units of chorionic gonadotropin, 25 milligrams of thiamin chloride, and 52.5 parts per million of glutamic acid per cubic centimeter.

7. A method of treating the male climacteric and senility which comprises administering to a patient having such symptoms a therapeutic composition comprising as essential coactive ingredients chorionic gonadotropin, glutamic acid, and thiamin chloride in a ratio of about 160 to 320 international units of chorionic gonadotropin to about .1 milligram to 10 milligrams of glutamic acid and thiamin chloride in an amount of at least two and one-half times the amount of the glutamic acid.

References Cited in the file of this patent

Beecher: J.A.M.A., vol. 158, No. 5, June 4, 1955, pp. 339–401.

Modell: J.A.M.A., vol. 167, No. 18, Aug. 30, 1958, pp. 2190–2199.

Davidson: Am. Practitioner and Digest of Treatment, vol. 7, No. 10, October 1956, pp. 1627–1632.

Modern Drug Encyl., 4th Ed., Howard, January 1949, pp. 196, 375.

Grollman: Essentials of Endocrinology, 2nd ed., 1947 pp. 485, 486, Lippincott Co.

J.A.M.A., vol. 114, No. 6, Feb. 10, 1940, pp. 487–489.

U.S. Disp., 24th ed., 1947, pp. 1209 and 1210.

Hirschfield: Archives of Otolaryngology, vol. 44, December 1946, pp. 686–689.

Modern Drug Encyl., 3rd ed., 1946, pp. 181 and 329, Yorke Pub. Co., N.Y.